(12) United States Patent
Qi et al.

(10) Patent No.: US 7,646,763 B2
(45) Date of Patent: Jan. 12, 2010

(54) METHOD AND APPARATUS FOR IMPROVING VOICE BAND DATA (VBD) CONNECTIVITY IN A COMMUNICATIONS NETWORK

(75) Inventors: David Cheng-Song Qi, Westford, MA (US); Yan Wang, Arlington, MA (US); Timothy G. Wade, Litchfield, NH (US)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 10/961,616

(22) Filed: Oct. 8, 2004

(65) Prior Publication Data

US 2006/0077987 A1     Apr. 13, 2006

(51) Int. Cl.
*H04L 12/66* (2006.01)
(52) U.S. Cl. ........................... 370/352; 370/465
(58) Field of Classification Search .............. None
See application file for complete search history.

(56) References Cited

U.S. PATENT DOCUMENTS

| | | | |
|---|---|---|---|
| 5,420,921 A | 5/1995 | Lähdemäki | |
| 5,533,121 A | 7/1996 | Suzuki et al. | |
| 5,875,246 A | 2/1999 | Houghton | |
| 6,212,374 B1 | 4/2001 | Scott et al. | |
| 6,229,846 B1 * | 5/2001 | Lassig et al. | 375/222 |
| 6,400,802 B1 | 6/2002 | Legare | |
| 6,504,838 B1 | 1/2003 | Kwan | |
| 6,549,587 B1 | 4/2003 | Li | |
| 6,584,110 B1 * | 6/2003 | Mizuta et al. | 370/401 |
| 6,738,358 B2 | 5/2004 | Bist et al. | |
| 6,754,232 B1 | 6/2004 | Tasker | |
| 6,757,301 B1 | 6/2004 | Tsai | |
| 6,765,931 B1 | 7/2004 | Rabenko et al. | |
| 6,993,007 B2 | 1/2006 | Gummalla et al. | |
| 6,993,358 B2 | 1/2006 | Shiotsu et al. | |
| 7,002,992 B1 * | 2/2006 | Shaffer et al. | 370/468 |
| 7,075,979 B2 * | 7/2006 | Beadle et al. | 375/222 |

(Continued)

OTHER PUBLICATIONS

XP-002362870,"tone incoming ip/pstn ans disable echo suppressor", Online, May 11, 2004, pp. 1-9, Retrieved from Internet: URL: http://www.cisco.com/univercd/cc/td/doc/product/access/acs_serv/as5850/sw_conf/tone_cli.pdf> retrieved on Jan. 12, 2006.

*Primary Examiner*—Chirag G Shah
*Assistant Examiner*—Suk Jin Kang
(74) *Attorney, Agent, or Firm*—Hamilton, Brook, Smith & Reynolds, P.C.

(57) ABSTRACT

High compression rate codecs in gateways servicing Voice-over-Internet Protocol (VoIP) and Voice Band Data (VBD) calls distort modem/fax Answer Back Tones (e.g., 2100 Hz), which may lead to signal distortion and call hang-ups. To prevent such occurrences, a method or corresponding apparatus forces originating and terminating gateways to stay in a low complexity non-voice compression codec (e.g., ITU G.711) after prenegotiating a high complexity, voice compression codec (e.g., G.729 or G.726) during a short beginning period of a voice call. The low complexity codec avoids distorted answer back tone leakage associated with previous solutions that use a notch filter to block the leakage, thereby significantly improving the success rate of a VBD call by completely eliminating modem answer back tone distortion caused by high complexity codecs that use voice compression and by completely eliminating use of the notch filter.

24 Claims, 5 Drawing Sheets

U.S. PATENT DOCUMENTS

| | | | |
|---|---|---|---|
| 7,263,107 B1 * | 8/2007 | Johnston et al. | 370/467 |
| 7,411,941 B2 * | 8/2008 | Chu et al. | 370/352 |
| 2001/0021186 A1 | 9/2001 | Ono et al. | |
| 2001/0046259 A1 * | 11/2001 | Abrishami | 375/222 |
| 2002/0064139 A1 | 5/2002 | Bist et al. | |
| 2002/0080730 A1 | 6/2002 | LeBlanc | |
| 2002/0101830 A1 * | 8/2002 | LeBlanc | 370/286 |
| 2002/0141392 A1 * | 10/2002 | Tezuka et al. | 370/352 |
| 2003/0091034 A1 * | 5/2003 | Koistinen | 370/352 |
| 2003/0095544 A1 | 5/2003 | Chu | |
| 2003/0193696 A1 | 10/2003 | Walker et al. | |
| 2004/0190499 A1 | 9/2004 | Chen et al. | |
| 2005/0117594 A1 | 6/2005 | Ryan | |
| 2006/0285171 A1 * | 12/2006 | Ma et al. | 358/400 |

* cited by examiner

FIG. 4

METHOD AND APPARATUS FOR IMPROVING VOICE BAND DATA (VBD) CONNECTIVITY IN A COMMUNICATIONS NETWORK

BACKGROUND OF THE INVENTION

A traditional telephone system provides an ability for users with modems to connect to a Remote Access Server (RAS) for digital communications over standard voice lines. This same capability is provided by Voice-Over-Internet Protocol (VoIP) gateways (GW) through the use of a Modem Pass Through (MPT) or voice band data (VBD) mode. VoIP gateways also provide telephone voice services replacing traditional telephony switches.

During a call set-up procedure, an originating gateway (OGW) and terminating gateway (TGW) exchange capabilities via a call control protocol (International Telecommunications Union (ITU) H.323 or Media Gateway Control Protocol (MGCP)) and negotiate a voice encoder/decoder (codec) that is supported by both gateways. Some complex codecs, such as ITU G.729, are supported and most commonly used by VoIP gateways for bandwidth saving purposes. These complex codecs work well in most voice-only calls. However, due to the compression algorithm of complex codecs, VBD calls experience problems, including signal distortion and call hang-ups. Therefore, in voice mode, once a VoIP gateway detects a modem/fax Answer Back Tone (ABT), it switches into VBD mode, which uses a low complexity codec, such as ITU G.711, thereby preventing VBD signal distortion and providing reliable VBD call connections.

During the voice-to-VBD mode change, the OGW and TGW communicate with each other using peer to peer messages via a packet switched network, such as an Internet Protocol (IP) network. There are several such protocols for this, including one that uses peer-to-peer messages that carry a Named Signaling Event (NSE) packet with an Event ID defined by a manufacturer or service provider. The NSE packet uses an Network Terminating Equipment (NTE) format defined in ITU Request for Comments (RFC) document 2833 ("RFC 2833").

RFC 2833 is an IETF "standards track" proposal for carrying Named Signaling Events as RTP packets. According to this standard, the RTP Payload Format for Named Telephone Events includes an Event ID indicating the Particular named telephone event, as well as a volume and a duration for each DTMF digit.

All of the work during a VBD mode switch, including modem/fax answer back tone detection, peer-to-peer message exchange, and the mode switch, introduces time delay. Therefore, if the original voice call is running in a complex codec other than G.711, a certain duration of modem/fax answer back tone may be distorted and transmitted to the client side before the VBD mode switch is completed. This may cause some client modem hang-ups due to the unrecognized modem answer back tone, thus lowering the success rate of VBD calls.

One current solution is to apply a notch filter to block 2100 Hz modem Answer Back Tones so that the tone leakage (i.e., unwanted tones passing through to the client side) does not exceed 50 msec when a call is running on a complex codec other than ITU G.711.

SUMMARY OF THE INVENTION

The notch filter solution that is presently used to block the 2100 Hz modem or fax answer back tone has two major drawbacks:

1. Although most VBD calls use 2100 Hz answer back tones, some other modem modulation standards use other frequencies for the answer back tone. Current notch filter solutions cannot cover modem answer back tones other than 2100 Hz.

2. For normal voice traffic, the 2100 Hz frequency is filtered out by the notch filter. This may not have severe impact on the overall voice quality if the notch filter is well designed to have enough sharp and narrow block band around 2100 Hz. However, if improperly designed, the notch filter can adversely affect overall voice quality.

In order to avoid distorted answer back tone leakage from being transmitted to the client side before the VBD mode switch is completed, thereby causing client modem hang-ups due to an unrecognized modem answer back tone, a method or corresponding apparatus according to the principles of the present inventions forces both originating and terminating gateways to stay in a low complexity voice codec (e.g., ITU G.711) during a short beginning period of a voice call.

Accordingly, one embodiment according to the principles of the present invention includes a method, and corresponding apparatus, for improving voice band data connectivity in a communications network. The method may be executed in an originating gateway (OGW) and a terminating gateway (TGW) in operative communications with each other. During a call set-up procedure, the OGW and TGW may prenegotiate a high complexity codec, which provides voice compression, for voice mode. The OGW determines if the TGW is equipped (i) to wait a predetermined length of time to receive an indication of a VBD call within the predetermined length of time (e.g., 1 second±750 msec) and (ii) to enter voice mode in an absence of receiving the indication of a VBD call within the predetermined length of time. The OGW and TGW may determine this capability via a Network Terminating Equipment (NTE) exchange. If the TGW is so equipped, rather than using the prenegotiated codec, the OGW starts the call in a low complexity codec that does not perform voice compression. Use of the low complexity codec by the OGW causes the TGW to use the low complexity codec. If the indication that the call is a VBD (e.g., modem) call (e.g., 2100 Hz tone) is received within the predetermined length of time, the TGW may enter VBD mode including turning off echo cancellation and voice activity detection. If the indication of a VBD call is not received within the predetermined length of time, the TGW enters voice mode, including switching to the prenegotiated high complexity codec. The OGW enters VBD or voice mode responsive to the TGW's entering voice mode.

Thus, the principles of the present invention overcome the drawbacks of the notch filter technique of the prior art by forcing the voice gateways to stay in a low complexity codec for a short period during the beginning of a VoIP call. This significantly improves the success rate of a VBD call by completely eliminating modem answer back tone distortion. In addition, the principles of the present invention have the following advantages:

1. There is no need to implement a notch filter, which provides for a lower code complexity and saves program memory.

2. There is no need for a tone detector implementation for high complexity codecs. Since the low complexity codecs (e.g., G.711) require very little code space, this solves a program memory shortage issue in high complexity codecs.

3. VBD call success rates are improved since the low complexity codec has a minimum distortion to the answer back tone signal.

4. Using a low complexity codec during the beginning of a call has little effect on the overall bandwidth required.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
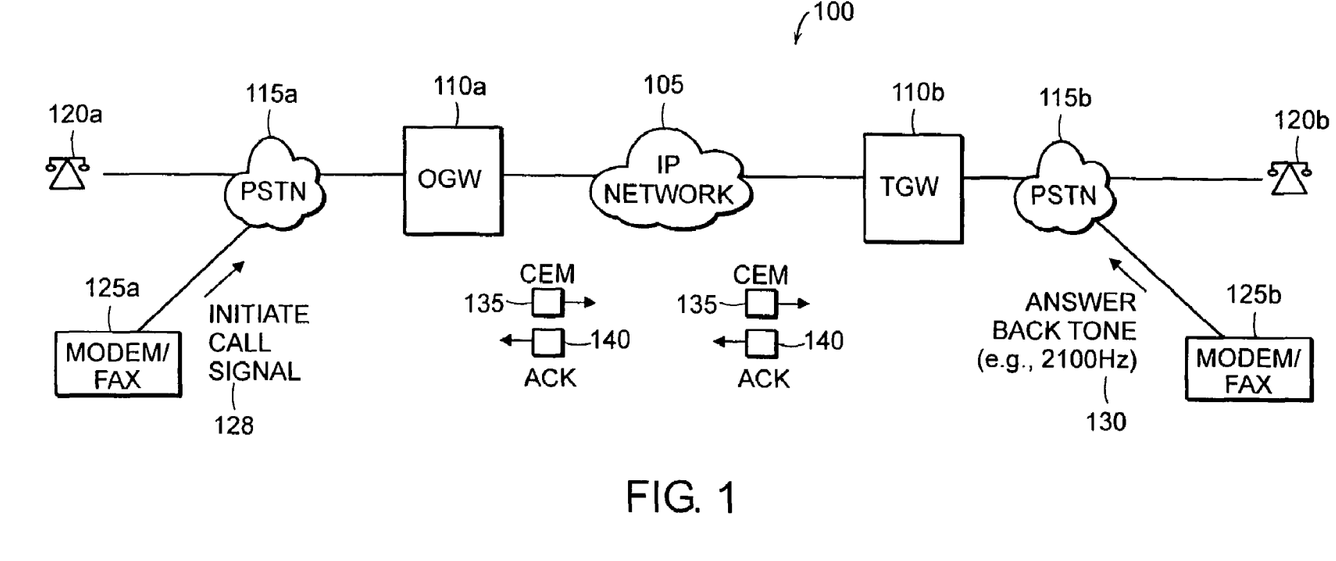
FIG. 1 is a network diagram of a communications network in which the principles of the present invention may be employed.

FIG. 1 is a network diagram of a network 100 in which the principles of the present invention may be employed. The network 100 includes an Internet Protocol (IP) network 105. Connected to the left side of the IP Network 105 is an originating gateway (OGW) 110a, and connected to the right side of the IP network 105 is a terminating gateway 110b.

On one side of the IP network, a public switched telephone network (PSTN) 115a serves to connect a telephone 120a and modem/fax 125a to the OGW 110a. The modem/fax 125a is shown sending an initiate call signal (e.g., dialed digits of another modem/fax 125b) 128 to the PSTN 115a, which is received by the OGW 110a for Voice-over-Internet Protocol (VoIP) service. On the other side of the IP network 105, a PSTN 115b serves to connect a telephone 125b and modem/fax 125b to the TGW 110. The modem/fax 125b is shown sending an answer back tone (e.g., 2100 Hz) which, when received by the TGW 110b, causes the TGW to enter a VBD mode. Through use of the principles of the present invention, the TGW 110b does not affect the answer back tone 130 and, therefore, does not cause the call to hang-up.

More specifically, a procedure according to the principles of the present invention can be implemented as the following two steps:

1. After a voice call is established, the OGW 110a starts with a non-voice compression codec, such as G.711, also referred to herein as a low-complexity codec, even if a high complexity codec was negotiated in the call set-up procedure. After a call is initiated, the OGW 110a transmits a special data packet carrying a Capability Exchange Message (CEM) 135 to the TGW 110b. Then, the OGW 110a waits for an acknowledgment (ACK) message 140 from the TGW 110b until a predefined timeout (referred to herein as timeout A) expires, which may be configurable up to at least a longest two-way delay of communications between the OGW and TGW over a packet switched network and shorter than a client modem's answer back tone detection timeout. An example of timeout A is between 250 and 2000 milliseconds. If the ACK message is received successfully before timeout A expires, the OGW 110a keeps using the G.711 codec and is available to transmit VBD signals to the traditional telephony network (i.e., PSTN 115a). If no ACK message 140 is received before timeout A expires, the OGW 110a switches to the complex codec that was negotiated during the call set-up procedure and is available to transmit voice signals to the telephony network. Before the ACK message is received or timeout A expires, the OGW 110a may stop transmitting Pulse Code Modulation (PCM) signals to the telephony network 115a in order to block leakage of distorted answer back tones.

2. After the call is established, the TGW 110b, responsive to the OGW 110a, starts with a non-voice compressing codec (e.g., G.711 codec) to compose the data packets. If the TGW 110b receives the capability exchange message from the OGW 110a, the TGW 110b responds to the OGW 110a with an ACK message immediately. Also, the TGW 110b actively detects the modem answer back tone from the traditional telephony network. If an answer back tone is detected by the TGW 110b before a second timeout (referred to herein as timeout B) expires, it switches to VBD mode by following the standard procedure for switching into VBD mode. If no answer back tone is detected before the second timeout expires, the TGW 110b switches back to the high complexity codec that was negotiated during the call set-up procedure.

The capability exchange messages (GEM) 135 between the OCW and TCW can use an NTE message format, described in Request for Comments (RFC) document 2833 ("RFC 2833") published by the Internet Engineering Task Force (IETF), by adding new event IDs. RFC 2833 is an IETF "standards track" proposal for carrying Named Signaling Events as RTP packets. According to this standard, the RTP Payload Format for Named Telephone Events includes an Event ID indicating the particular named telephone event, as well as a volume and a duration for each DTMF digit.

Figure 2:
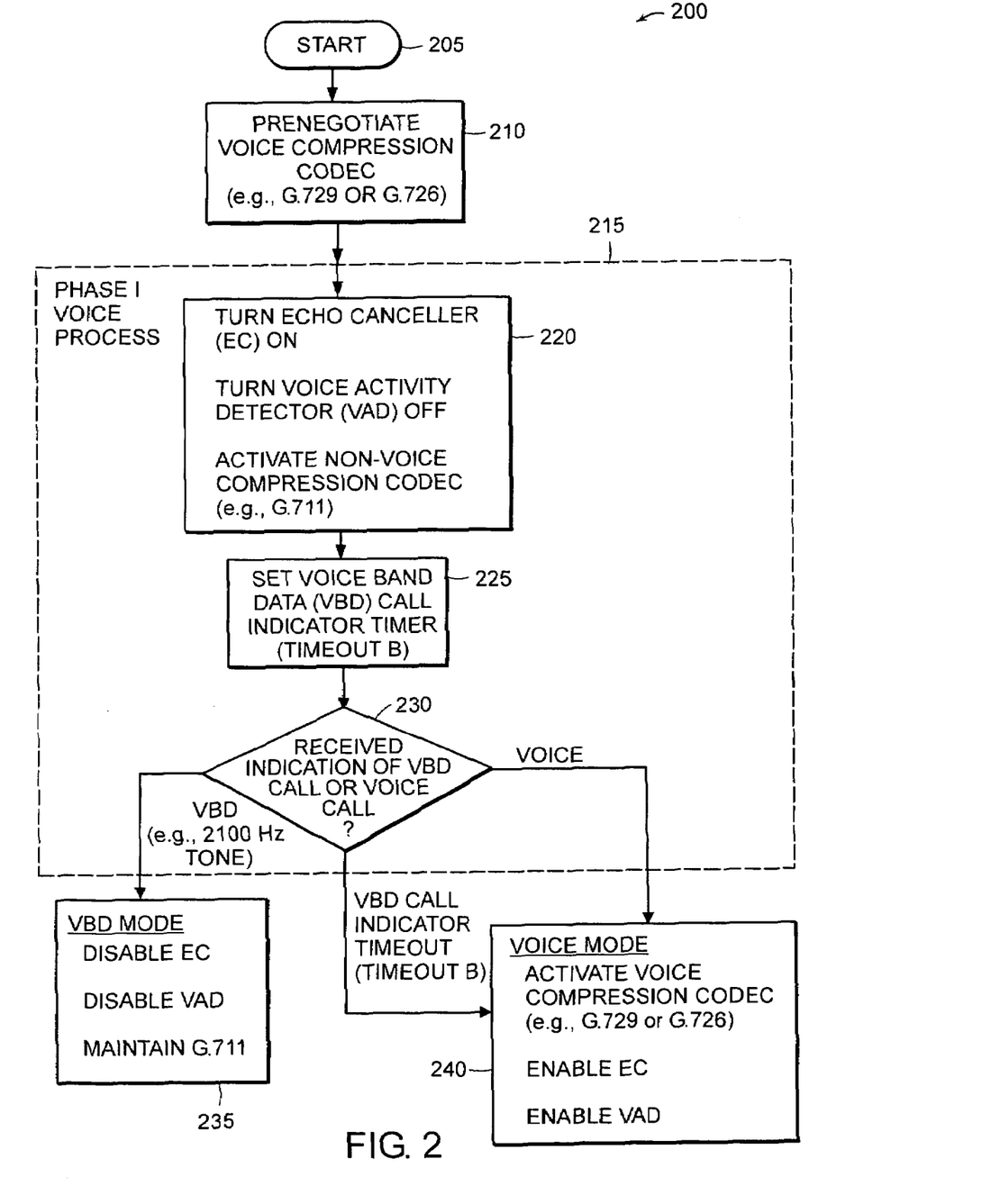
FIG. 2 is a flow diagram of a process according to the principles of the present invention executing in a terminating gateway (TGW) in the communications network of FIG. 1.
Figure 3:
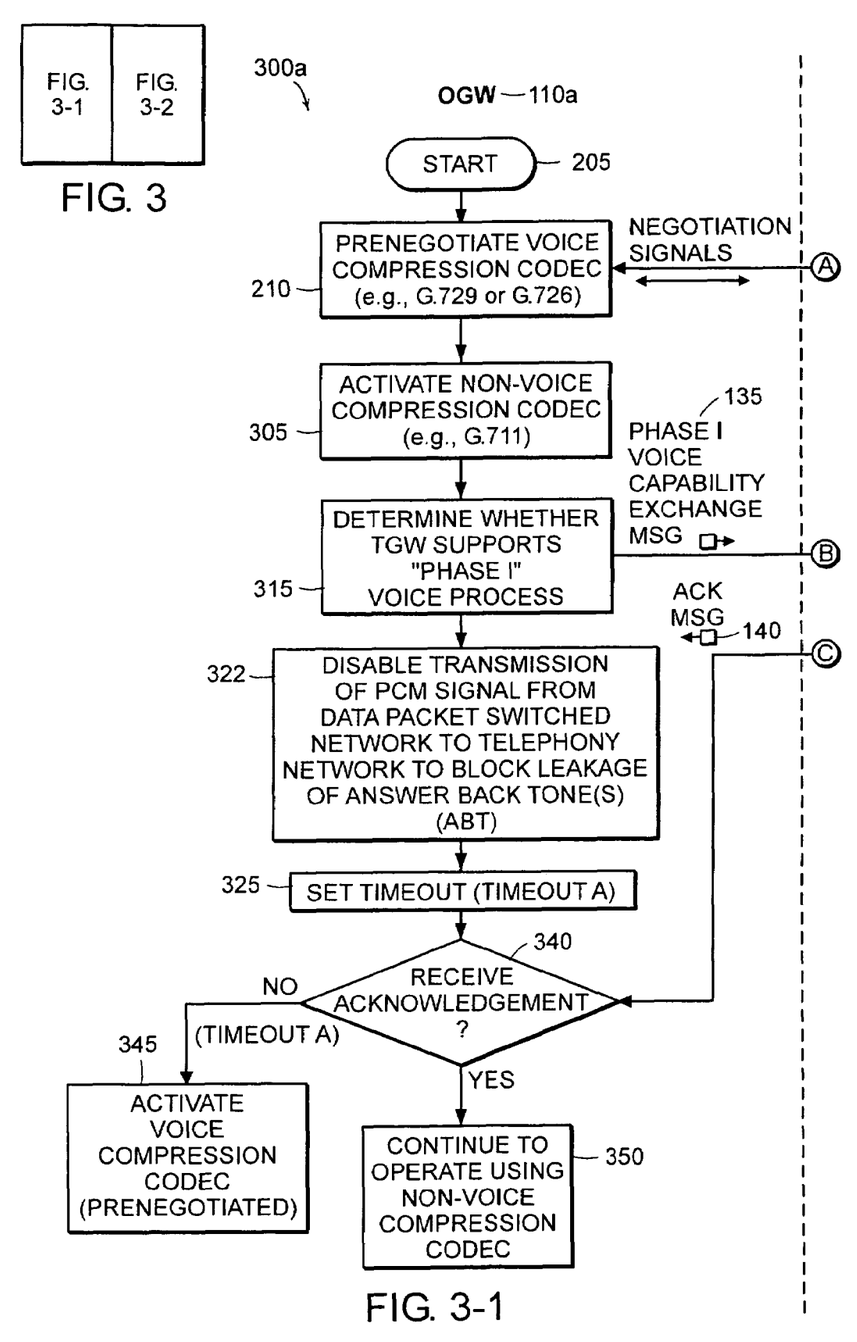
FIG. 3 is a flow diagram of processes operating concurrently in an originating gateway (OGW) and the TGW in the communications network of FIG. 1.

FIGS. 2 and 3 illustrate embodiments of the above-described process in flow diagram form.

FIG. 2 is a flow diagram of a process 200 executed in the TGW 110b of FIG. 1. The process 200 starts (step 205) and prenegotiates a voice compression codec, such as G.729 or G.726, with the OGW 110a (step 210). The process 200 next executes a "Phase I voice process" (step 215). The Phase I voice process includes activating an Echo Canceller (EC), activating a Voice Activity Detector (VAD), and activating a non-voice compression codec (step 220). The Phase I voice process 215 also sets a VBD call indicator timer (step 225) to the predefined timeout B (step 225). If the TGW receives an indication of a VBD call or a voice call (step 230), the Phase I voice process 215 proceeds in a manner supporting the type of call detected. Specifically, in the case of a VBD indication (e.g., 2100 Hz tone), the process 200 sets the channel in the TGW 110b to VBD mode (Step 235). VBD mode includes disabling the echo canceller, disabling the voice activity detector, and maintaining the G.711 codec. Note that maintaining the low-complexity codec occurs in this case because of setting the prenegotiated high complexity codec to the low complexity codec. If voice is detected or the VBD call indicator timeout (timeout B) occurs, the process 200 proceeds to set the channel in the TGW 110b to voice mode (step 240). Voice mode includes activating the voice compression codec (e.g., G.729 or G.723) that was prenegotiated.

In an alternative embodiment, the TGW 110b may be preconfigured with its echo canceller and voice activity detector disabled so that the TGW 110b does not enter VBD mode per se upon receipt of an indication the call is a VBD call. In yet other embodiments, other non-VBD mode configurations are possible that do not affect the answer back tone in a manner leading to call hang-up or other communications errors.

FIG. 3 is a flow diagram illustrating processes 300a, 300b executed by the OGW 110a and TGW 110b, respectively. The process 300a in the OGW 110a starts (step 205) by prenegotiating a voice compression codec (e.g., G.729 or G.726) (step 210) with the TGW process 300b. The process 300a activates a non-voice compression codec (e.g., G.711) after prenegotiating the voice compression codec (step 305).

The process 300a determines whether the TGW 110b supports a Phase I voice process (step 315) by transmitting a Phase I voice Capability Exchange Message (CEM) 135 to the TGW 110b.

The OGW process 300a may next disable the transmission of Pulse Code Modulated (PCM) signals to the telephony network 110a to block leakage of answer back tones (step 322) received from the data packet switched network 105. The process 300a then sets timeout A (step 325), which is used to set a maximum limit for waiting for an acknowledgment from the TGW as to whether it can perform the Phase I voice process 215 described in reference to FIG. 2.

In the TGW 110b, its process 300b starts (205) and prenegotiates the voice compression codec (210) with the OGW process 300a. The TGW 110b proceeds to activate the prenegotiated voice compression codec (step 310). The process 300b in the TGW 110b continues by detecting whether a Phase I CEM 135 has been detected (step 320). If a CEM 135 is not received, the process 300b continues with standard operations (step 335), which include using the prenegotiated voice compression codec. If the CEM 135 is received, the process 300b sends an acknowledgment message (ACK MSG) 140 (step 330) and executes the process 200 described in reference to FIG. 2.

Referring again to the OGW process 300a, if the acknowledgment message 140 is received (step 340), the process 300a continues to operate using a low complexity codec (step 350), which uses a non-voice compression codec. If an acknowledgment is not received (i.e., timeout A occurs), the process 300a sets the OGW 110a to use the prenegotiated voice compression codec (step 345).

Figure 4:
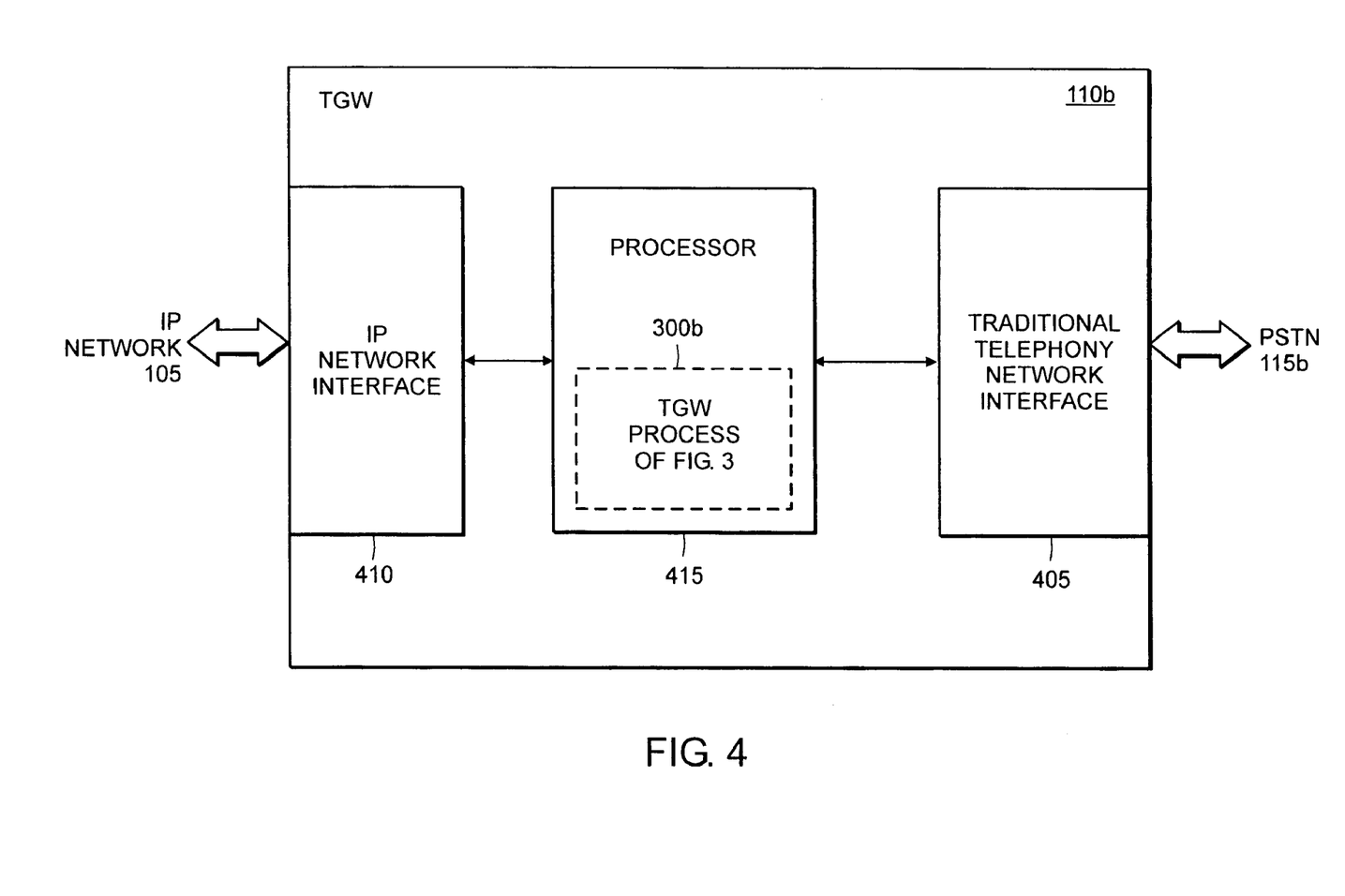
FIG. 4 is a high level schematic diagram of the TGW in the communications network of FIG. 1 executing its process of FIG. 3.

FIG. 4 is a generalized schematic diagram of the TGW 110b. The TGW 110b includes a traditional telephony network interface 405, which communicates with the PSTN 115b, and an IP network interface 410, which communicates with the IP network 105. The TGW 110b includes a processor 415 in communication with the IP network interface 410 and traditional telephony network interface 405. The processor 415 executes the process 300b of FIG. 3.

It should be understood that the processes of FIGS. 2 and 3 typically occur on a channel-by-channel basis in the gateways, where Digital Signal Processors (DSP's), for example, in the channels (not shown) execute program instructions to perform the processes 200, 300a, and 300b. The processes 200, 300a, 300b described herein may be implemented in the form of hardware, firmware, or software. If provided in software, the software may be provided on a computer readable medium, such as RAM, ROM, optical or magnetic disk, or other computer-readable media. The software may also be stored remotely from the OGW or TGW and be downloaded via the IP network 105, for example, or downloaded via other network. In operation, the processor 415, in the example embodiment of FIG. 4, loads the software (i.e., computer instructions) and executes the instructions in a manner well known in the art.

One way of verifying that the processes described herein operate as expected is by using a data packet capture tool. This data packet capture tool determines if a voice codec is switched. This can be done in a normal voice call by setting the default codec to a high complexity codec, such as G.729. If the captured data packets show that there are switch-overs between a low complexity codec and the high complexity codec during the beginning period of a normal voice call, proper operation is being performed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of improving Voice Band Data (VBD) connectivity in a communications network, the method comprising:
    by a terminating gateway (TGW),
        negotiating use of a voice compression codec;
        enabling a non-voice compression codec following the negotiating;
        waiting a predetermined length of time for receipt of a VBD call indication;
        switching to voice mode, including use of the negotiated voice compression codec, if the VBD indication is not received within the predetermined length of time;
        acknowledging capability of said waiting and switching to an originating gateway (OGW); and
        wherein the predetermined length of time is a second predetermined length of time and wherein acknowledging the capability is performed within a first predetermined length of time.

2. The method according to claim 1 wherein the first predetermined length of time is configurable up to at least a longest two-way delay of communications between the OGW and TGW over a packet switched network and shorter than a client modem's answer back tone detection timeout.

3. The method according to claim 1 further including entering VBD mode, including continuing use of the non-voice compression codec, if a VBD call indication is received within the second predetermined length of time.

4. The method according to claim 1 wherein acknowledging the capability includes transmitting a capability exchange message to the OGW in a Network Terminating Equipment (NTE) message format described in RFC 2833 with a new event ID.

5. The method according to claim 1 wherein the voice compression codec is a G.729 or G.726 codec and the non-voice compression codec is a G.711 codec.

6. An apparatus for improving Voice Band Data (VBD) connectivity in a communications network, comprising:
    a telephony interface supporting voice and voice band data (VBD) communications for a telephony network;
    an Internet Protocol (IP) network interface supporting Voice-over-IP (VoIP) communications with an IP network; and
    a processor coupled to the telephony network interface and IP network interface, the processor:
        negotiates use of a voice compression codec;
        enables a non-voice compression codec following the negotiating;
        waits a predetermined length of time for receipt of a VBD call indication; and
        switches to voice mode, including use of the negotiated voice compression codec, if the VBD indication is not received within the predetermined length of time;
        acknowledges the capability to the inquiring processor by transmitting a capability exchange message to the inquiring processor in a Network Terminating Equipment (NTE) message format described in RFC 2833 with a new event ID; and wherein the predetermined length of time is a second predetermined length of time and wherein the first processor acknowledges capability of said waiting and switching to the inquiring processor within a first predetermined length of time.

7. The apparatus according to claim 6 wherein the first predetermined length of time is configurable up to at least a longest two-way delay of communications between the inquiring processor and the processor over a packet switched network and shorter than a client modem's answer back tone detection timeout period.

8. The apparatus according to claim 6 wherein the processor further enters VBD mode, including continuing use of the non-voice compression codec, if a VBD call indication is received within the second predetermined length of time.

9. The apparatus according to claim 6 wherein the processor acknowledges the capability to the inquiring processor by transmitting a capability exchange message to the inquiring processor in a Network Terminating Equipment (NTE) message format described in RFC 2833 with a new event ID.

10. The apparatus according to claim 6 wherein the voice compression codec is a G.729 or G.726 codec and the non-voice compression codec is a G.711 codec.

11. A computer program product having a computer readable medium including computer program instructions recorded thereon that, when executed on a computer processor in a terminating gateway (TGW), cause the processor to:
  negotiate use of a voice compression codec;
  enable a non-voice compression codec following the negotiating;
  wait a predetermined length of time for receipt of a VBD call indication;
  switch to voice mode, including use of the negotiated voice compression codec, if the VBD indication is not received within the predetermined length of time;
  acknowledge capability of said wait and switch to an originating gateway (OGW); and
  wherein the predetermined length of time is a second predetermined length of time and wherein the computer program instructions that cause the computer processor to acknowledge the capability include instructions to acknowledge the capability within a first predetermined length of time.

12. The computer program product according to claim 11 wherein the first predetermined length of time is configurable up to at least a longest two-way delay of communications between the OGW and TGW over a packet switched network but shorter than a client modem's answer back tone detection timeout.

13. The computer program product according to claim 11 wherein the computer program instructions further include instructions that cause the processor to enter VBD mode, including continuing use of the non-voice compression codec, if a VBD call indication is received within the second predetermined length of time.

14. The computer program product according to claim 11 wherein the computer program instructions that cause the computer processor to acknowledge the capability includes computer program instructions that cause the computer processor to transmit a capability exchange message to the OGW in a Network Terminating Equipment (NTE) message format described in RFC 2833 with a new event ID.

15. The computer program product according to claim 11 wherein the voice compression codec is a G.729 or G.726 codec and the non-voice compression codec is a G.711 codec.

16. An apparatus for improving Voice Band Data (VBD) connectivity in a communications network, comprising:
  means for negotiating use of a voice compression codec;
  means for enabling a non-voice compression codec following the negotiating;
  means for waiting a predetermined length of time for receipt of a VBD call indication;
  means for switching to voice mode, including use of the negotiated voice compression codec, if the VBD indication is not received within the predetermined length of time;
  means for acknowledging capability of said waiting and switching to an originating gateway (OGW); and
  wherein the predetermined length of time is a second predetermined length of time and wherein acknowledging the capability is performed within a first predetermined length of time.

17. The apparatus according to claim 16 further including means for entering VBD mode, including continuing use of the non-voice compression codec, if a VBD call indication is received within the second predetermined length of time.

18. A system for improving Voice Band Data (VBD) connectivity in a communications network, comprising:
  an originating gateway (OGW) in the communications network;
  a terminating gateway (TGW) in the communications network in operative communications with the OGW; the OGW and TGW prenegotiating a voice compression codec for voice mode, the OGW (i) determining if the TGW is equipped to wait a first predetermined length of time for receipt of a VBD call indication, (ii) switching to voice mode, including use of a negotiated voice compression codec, in an absence of receiving the indication of a VBD call within the first predetermined length of time, and, (iii) if the TGW is so equipped, switching to a non-voice compression codec causing the TGW to switch to the non-voice compression codec; the TGW (i) continuing use of the non-voice compression codec if the indication of a VBD call is received within a second predetermined length of time and (ii) entering voice mode, including switching to the prenegotiated voice compression codec, if the indication of a modem call is not received within the second predetermined length of time, the OGW entering voice mode responsive to the TGW's entering voice mode.

19. The system according to claim 18 wherein the TGW enters VBD mode, including continuing use of the non-voice compression codec, if a VBD call indication is received within the predetermined length of time.

20. The system according to claim 18 wherein the OGW determines the capabilities of the TGW by transmitting a capability exchange message to the TGW and by receiving an appropriate response thereto.

21. The system according to claim 20 wherein the capability exchange message is a Network Terminating Equipment (NTE) message format described in ITU RFC 2833 with a new event ID.

22. The system according to claim 18 wherein the predefined length of time is configurable up to at least a longest two-way delay of a packet switched network but shorter than a client modem's answer back tone detection timeout.

23. The system according to claim 18 wherein is a G.729 or G.726 codec and is a G.711 codec.

24. The system according to claim 18 wherein the OGW discontinues transmitting Pulse Code Modulation (PCM) signals to the telephony network in order to block leakage of distorted answer back tones.

* * * * *

UNITED STATES PATENT AND TRADEMARK OFFICE
CERTIFICATE OF CORRECTION

| | | |
|---|---|---|
| PATENT NO. | : 7,646,763 B2 | Page 1 of 1 |
| APPLICATION NO. | : 10/961616 | |
| DATED | : January 12, 2010 | |
| INVENTOR(S) | : Qi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1428 days.

Signed and Sealed this

Twenty-eighth Day of December, 2010

David J. Kappos
*Director of the United States Patent and Trademark Office*